(12) United States Patent
Liu et al.

(10) Patent No.: US 11,681,841 B1
(45) Date of Patent: Jun. 20, 2023

(54) METHOD AND DEVICE FOR CALCULATING OPTIMAL LEVELING STIFFNESS OF PILE TOP DISPLACEMENT REGULATORS IN COMPOSITE FOUNDATION

(71) Applicants: KUNMING PROSPECTING DESIGN INSTITUTE OF CHINA NONFERROUS METALS INDUSTRY CO., LTD., Kunming (CN); KUNMING UNIVERSITY OF SCIENCE AND TECHNOLOGY, Kunming (CN)

(72) Inventors: Wenlian Liu, Kunming (CN); Sugang Sui, Kunming (CN); Ze Li, Kunming (CN); Hanhua Xu, Kunming (CN); Bangtuan Wang, Kunming (CN); Pengfei Xu, Kunming (CN); Zejiang Li, Kunming (CN); Yahong Fan, Kunming (CN)

(73) Assignees: KUNMING PROSPECTING DESIGN INSTITUTE OF CHINA NONFERROUS METALS INDUSTRY CO., LTD, Kunming (CN); KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 0 days.

(21) Appl. No.: 17/943,226

(22) Filed: Sep. 13, 2022

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC ...... G06F 2113/26; G06F 30/20; G06F 30/00; G06F 2111/10
(Continued)

(56) References Cited

U.S. PATENT DOCUMENTS 10,140,388 B1 * 11/2018 Rassaian ................. G06F 30/23

FOREIGN PATENT DOCUMENTS

| CN | 112982358 A | * | 6/2021 | |
| CN | 114386306 A | * | 4/2022 | |
| WO | WO-2017027598 A1 | * | 2/2017 | ........... B29C 66/967 |

* cited by examiner

*Primary Examiner* — Cedric Johnson
(74) *Attorney, Agent, or Firm* — Bayramoglu Law Offices LLC

(57) ABSTRACT

A method and device for calculating an optimal leveling stiffness of pile top displacement regulators in a composite foundation are disclosed. The method includes: determining basic parameters for calculating the optimal leveling stiffness of the pile top displacement regulators in the composite foundation; building an optimal mathematical model for calculating the optimal leveling stiffness of the pile top displacement regulators in the composite foundation, and solving the optimal mathematical model for calculating the optimal leveling stiffness of the pile top displacement regulators in the composite foundation to obtain the optimal leveling stiffness. The method and device maximize the bearing capacity of the composite foundation by taking an optimal value of the leveling stiffness of the pile top displacement regulators. The method and device realize accurate quantitative analysis for composite foundation design by adjusting the value of the leveling stiffness of the pile top displacement regulators.

7 Claims, 4 Drawing Sheets

(58) Field of Classification Search
USPC .............................................................. 703/2
See application file for complete search history.

METHOD AND DEVICE FOR CALCULATING OPTIMAL LEVELING STIFFNESS OF PILE TOP DISPLACEMENT REGULATORS IN COMPOSITE FOUNDATION

CROSS REFERENCE TO THE RELATED APPLICATIONS

This application is based upon and claims priority to Chinese Patent Application No. 202210045695.X, filed on Jan. 16, 2022, the entire contents of which are incorporated herein by reference.

TECHNICAL FIELD

The present disclosure relates to a method and a device for calculating an optimal leveling stiffness of pile top displacement regulators in a composite foundation and belongs to the technical field of foundation treatment.

BACKGROUND

The composite foundation refers to an artificial foundation formed by replacing part of the soil in a natural foundation with reinforcements, such as concrete and aggregate. The composite foundation is widely used in engineering due to its convenient construction, cheap materials, and excellent performance. In recent years, with the popularization of high-performance pile foundation equipment, high-rise buildings often use composite foundations with concrete piles to form a "superstructure-raft-composite foundation" system. The stiffness distribution of the superstructure, the raft, and the composite foundation has a significant effect on the deformation and bearing capacity of the building. In the field of composite foundation design, there is still an important problem needing to be solved, that is, to control differential settlement and maximize the bearing capacity of the foundation to give full play to the performance of the composite foundation.

The differential settlement of the composite foundation is controlled by adjusting the stiffness of the foundation soil or adjusting the supporting stiffness of the piles. The supporting stiffness of the piles is usually adjusted by: (1) adjusting the pile arrangement method, (2) changing the parameters of the piles, such as the length, diameter, and spacing, and (3) setting displacement regulators between the pile tops and the raft.

After the displacement regulators are set between the pile tops and the raft, "the raft, the inter-pile soil, the piles, and the displacement regulators" form a very complex mechanical action system, as shown in FIGS. 2 and 3. Regarding the force transmission mechanism of the mechanical action system, the following aspects need to be clarified. (1) The load applied by the superstructure to the raft is jointly borne by the inter-pile soil, the piles, and the displacement regulators, but the proportion of them sharing the load is not clear. (2) The pile and the displacement regulator form a series system, and the inter-pile soil and "the pile and displacement regulator system" form a parallel system. The deformation coordination of the composite foundation must satisfy the condition that the deformation of the inter-pile soil is equal to the sum of the deformation of the concrete piles and the deformation of the pile top displacement regulators. However, it is currently technically impossible to accurately quantify and control the deformation coordination. (3) The deformation of the inter-pile soil and "the pile and displacement regulator system" has a great effect on the bearing capacity of the composite foundation. Therefore, it is urgent to give full play to the bearing capacity of the foundation under the deformation coordination of the inter-pile soil and "the pile and displacement regulator system". The stiffness of the pile top displacement regulators has a great effect on the bearing capacity of the composite foundation, but it is difficult to quantify the stiffness of the pile top displacement regulators.

There is currently a lack of methods to calculate the optimal leveling stiffness of the pile top displacement regulators in the composite foundation. To quantitatively and accurately evaluate the bearing capacity of the composite foundation and provide theoretical guidance for the composite foundation design, it is necessary to establish a theoretical method and mathematical model for calculating the optimal leveling stiffness of the pile top displacement regulators in the composite foundation.

SUMMARY

The present disclosure provides a method and device for calculating an optimal leveling stiffness of pile top displacement regulators in a composite foundation. By taking the pile top displacement regulators in the composite foundation as the research object and combining soil mechanics and mathematical programming theory, the present disclosure obtains the optimal leveling stiffness of the pile top displacement regulators in the composite foundation and provides a new approach for the composite foundation design.

The present disclosure adopts the following technical solution. A method for calculating an optimal leveling stiffness of pile top displacement regulators in a composite foundation includes the following steps:

determining basic parameters for calculating the optimal leveling stiffness of the pile top displacement regulators in the composite foundation;

building an optimal mathematical model for calculating the optimal leveling stiffness of the pile top displacement regulators in the composite foundation; and solving the optimal mathematical model for calculating the optimal leveling stiffness of the pile top displacement regulators in the composite foundation to obtain the optimal leveling stiffness.

The determining basic parameters for calculating the optimal leveling stiffness of the pile top displacement regulators in the composite foundation includes determining parameters of concrete piles; and determining parameters of foundation soil.

The parameters of the concrete piles include the diameter, the length, the lateral spacing, the vertical spacing of the concrete piles, and the standard value of a single-pile vertical bearing capacity.

The parameters of the foundation soil include the compressive modulus of inter-pile soil, the standard value of the bearing capacity of the inter-pile soil, and the stress diffusion coefficient of the composite foundation.

The building an optimal mathematical model for calculating the optimal leveling stiffness of the pile top displacement regulators in the composite foundation includes building the optimal mathematical model for calculating the optimal leveling stiffness of the pile top displacement regulators in the composite foundation by combining an objective function, a force control equation, a deformation coordination equation, a bearing capacity constraint condition of the inter-pile soil, and a bearing capacity constraint condition of the concrete piles.

The building an optimal mathematical model for calculating the optimal leveling stiffness of the pile top displacement regulators in the composite foundation specifically includes:

I. building the objective function by setting a total load applied to the top of the raft as the objective function and maximizing the total load to maximize the bearing capacity of the composite foundation:

Maximize: $Q$

II. Building the force control equation for the joint bearing of the concrete piles and the foundation soil, where the total load applied to the top of the raft is jointly borne by the concrete piles and the inter-pile soil:

$Q = n \times (F_s + F_z)$

III. Building the deformation coordination equation between the concrete piles and the inter-pile soil:

(1) Building the deformation equation of the inter-pile soil in the composite foundation:

$$\delta_s = \frac{2(2-\alpha)F_s L}{E_s(4dl - \pi D^2)}$$

(2) Building the deformation equation of the concrete piles in the composite foundation:

$$\delta_z = \frac{2(2-\alpha)F_z L}{\pi E_z D^2}$$

(3) Building the deformation equation of the pile top displacement regulators in the composite foundation:

$$\delta_k = \frac{F_z}{k_d}$$

(4) Building the deformation coordination control equation of the concrete piles and the inter-pile soil in the composite foundation, where the deformation of the inter-pile soil is equal to the sum of the deformation of the concrete piles and the deformation of the pile top displacement regulators:

$\delta_s = \delta_z + \delta_k$

IV. Building the bearing capacity constraint of the inter-pile soil:

$$F_s \leq \frac{f_a(4dl - \pi D^2)}{4}$$

V. Building the bearing capacity constraint of the concrete piles:

$F_z \leq P_a$

VI. Building the optimal mathematical model for calculating the optimal leveling stiffness of the pile top displacement regulators in the composite foundation based on the objective function, the force control equation, the deformation coordination equation, the bearing capacity constraint of the inter-pile soil, and the bearing capacity constraint of the concrete piles:

$$\begin{cases} \text{Maximize: } Q \\ \text{Subject to: } Q = n(F_s + F_z) \\ \quad \delta_s = \frac{2(2-\alpha)F_s L}{E_s(4dl - \pi D^2)}; \delta_z = \frac{2(2-\alpha)F_z L}{\pi E_z D^2}; \delta_k = \frac{F_z}{k_d} \\ \quad \delta_s = \delta_z + \delta_k \\ \quad F_s \leq \frac{f_a(4dl - \pi D^2)}{4} \\ \quad F_z \leq P_a \end{cases}$$

where Q denotes the total load applied to the top of the raft, Maximize denotes "maximize", $F_s$ denotes an additional single-pile load applied by the raft to the inter-pile soil in the composite foundation, $F_z$ denotes an additional single-pile load applied by the raft to the concrete pile in the composite foundation, n denotes the quantity of the concrete piles in the composite foundation, $\delta_s$ denotes the deformation of the inter-pile soil in the composite foundation, $F_s$ denotes the compressive modulus of the inter-pile soil in the composite foundation, d denotes the lateral spacing of the concrete piles in the composite foundation, l denotes the vertical spacing of the concrete piles in the composite foundation, D denotes the diameter of the concrete pile in the composite foundation, L denotes the length of the concrete pile in the composite foundation, $\alpha$ denotes the stress diffusion coefficient of the composite foundation, $\delta_z$ denotes the deformation of the concrete piles in the composite foundation, $E_z$ denotes the compressive modulus of the concrete piles in the composite foundation, $\delta_k$ denotes the deformation of the pile top displacement regulators in the composite foundation, $k_d$ denotes a leveling stiffness of the pile top displacement regulators in the composite foundation, $f_a$ denotes the standard value of the bearing capacity of the foundation soil, and $P_a$ denotes the standard value of the single-pile vertical bearing capacity.

The solving the optimal mathematical model for calculating the optimal leveling stiffness of the pile top displacement regulators in the composite foundation to obtain the optimal leveling stiffness includes bringing the known parameters n, $E_s$, d, l, D, L, $\alpha$, $E_z$, $f_a$, and $P_a$ into the optimal mathematical model for calculating the optimal leveling stiffness of the pile top displacement regulators in the composite foundation; solving the optimal mathematical model for calculating the optimal leveling stiffness of the pile top displacement regulators in the composite foundation by taking the total load Q applied to the top of the raft as the objective function and $F_s$, $F_z$, $\delta_s$, $\delta_z$, $\delta_k$, and $k_d$ as decision variables to obtain calculation results of the total load Q applied to the top of the raft and the decision variables $F_s$, $F_z$, $\delta_s$, $\delta_z$, $\delta_k$, and $k_d$; and obtaining an optimal value of the leveling stiffness $k_d$ of the pile top displacement regulators in the composite foundation to maximize the total load Q applied to the top of the raft. $F_s$ denotes an additional single-pile load applied by the raft to the inter-pile soil in the composite foundation. $F_z$ denotes an additional single-pile load applied by the raft to the concrete pile in the composite foundation. n denotes the quantity of the concrete piles in the composite foundation. $\delta_s$ denotes the deformation of the inter-pile soil in the composite foundation. $E_s$ denotes the compressive modulus of the inter-pile soil in the composite foundation. d denotes the lateral spacing of the concrete piles in the composite foundation. l denotes the vertical spacing of the concrete piles in the composite foundation. D denotes the diameter of the concrete pile in the composite foundation. L denotes the length of the concrete pile in the composite foundation. $\alpha$ denotes the stress diffusion coefficient of the composite foundation. $\delta_z$ denotes the deformation of the concrete piles in the composite foundation; $E_z$ denotes the compressive modulus of the concrete piles in the composite foundation. $\delta_k$ denotes the deformation of the pile top displacement regulators in the composite foundation. $f_a$ denotes the standard value of the bearing capacity of the foundation soil. $P_a$ denotes the standard value of the single-pile vertical bearing capacity.

The optimal mathematical model for calculating the optimal leveling stiffness of the pile top displacement regulators in the composite foundation is solved by an interior-point algorithm.

A device for calculating an optimal leveling stiffness of pile top displacement regulators in a composite foundation includes:

a first module configured to determine basic parameters for calculating the optimal leveling stiffness of the pile top displacement regulators in the composite foundation, a second module configured to build an optimal mathematical model for calculating the optimal leveling stiffness of the pile top displacement regulators in the composite foundation, and a solving module configured to solve the optimal mathematical model for calculating the optimal leveling stiffness of the pile top displacement regulators in the composite foundation to obtain the optimal leveling stiffness.

The present disclosure has the following beneficial effects. The present disclosure builds the optimal mathematical model for calculating the optimal leveling stiffness of the pile top displacement regulators in the composite foundation according to the basic parameters for calculating the optimal leveling stiffness of the pile top displacement regulators in the composite foundation. The present disclosure solves the optimal mathematical model for calculating the optimal leveling stiffness of the pile top displacement regulators in the composite foundation through the interior point algorithm and obtains the optimal value of the leveling stiffness of the pile top displacement regulator. The method of the present disclosure can achieve the following effects that cannot be achieved by traditional methods. (1) The present disclosure maximizes the bearing capacity of the composite foundation by taking an optimal value of the leveling stiffness of the pile top displacement regulators. (2) The method of the present disclosure can realize accurate quantitative analysis for composite foundation design by adjusting the value of the leveling stiffness of the pile top displacement regulators. (3) The present disclosure subjects the concrete piles and the inter-pile soil in the composite foundation to the deformation coordination control equation when the leveling stiffness of the pile top displacement regulators takes the optimal value, thereby effectively eliminating the settlement difference between the inter-pile soil and the concrete piles.

DETAILED DESCRIPTION OF THE EMBODIMENTS

Figure 1:
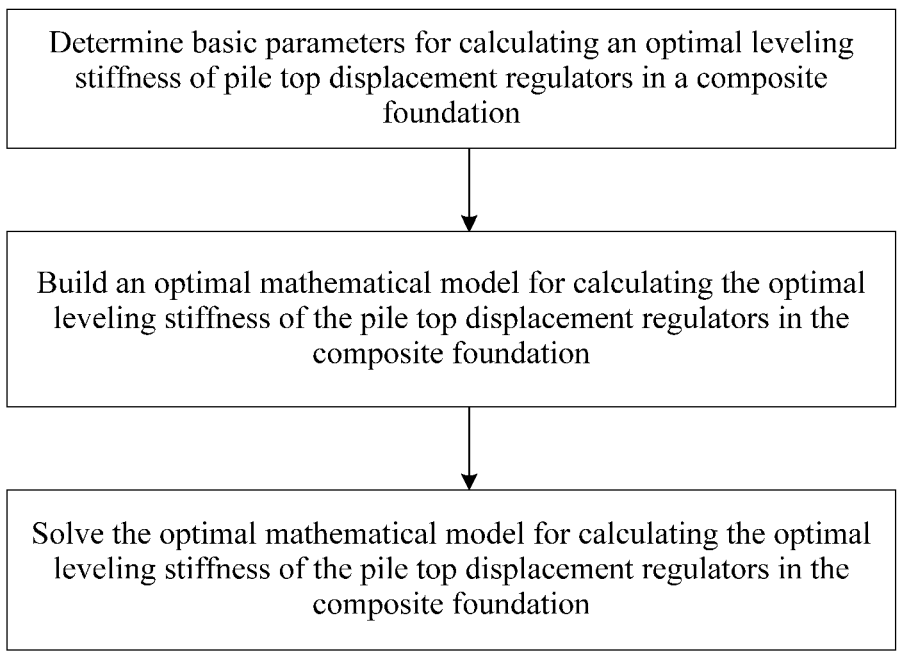
FIG. 1 is a flowchart of a method of the present disclosure.
Figure 2:
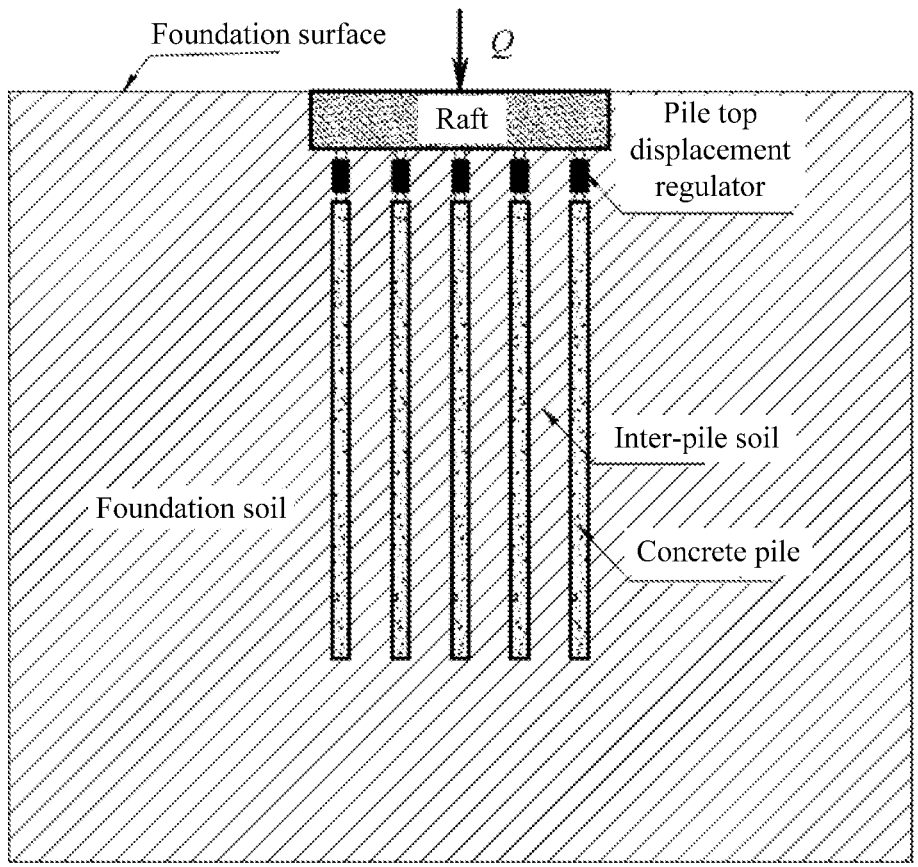
FIG. 2 is a longitudinal sectional view of a composite foundation.
Figure 3:
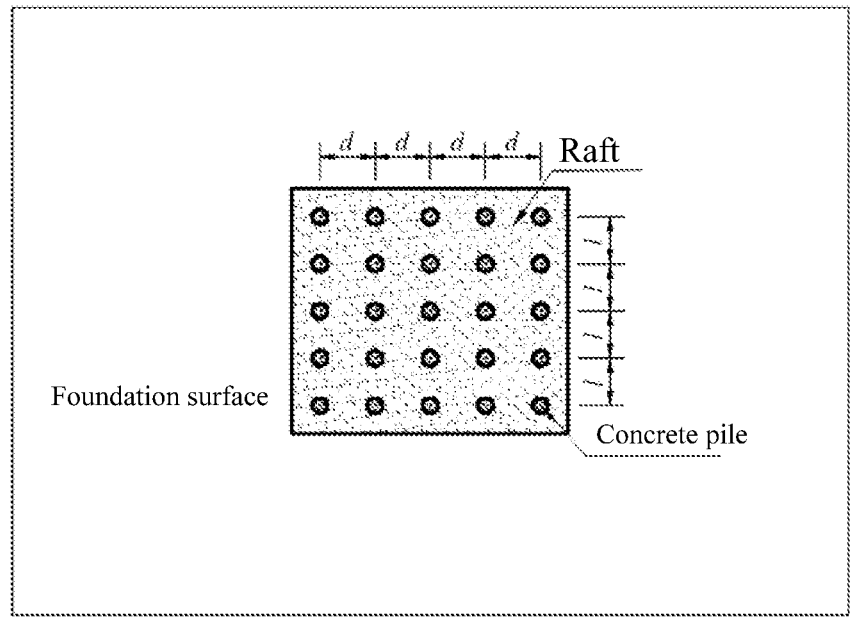
FIG. 3 is a plan view of the composite foundation.

The present disclosure is described in further detail below with reference to the drawings and embodiments, but the contents of the present disclosure are not limited thereto.

Embodiment 1: As shown in FIGS. 1 to 7, a method for calculating an optimal leveling stiffness of pile top displacement regulators in a composite foundation includes:

determine basic parameters for calculating the optimal leveling stiffness of the pile top displacement regulators in the composite foundation.

Build an optimal mathematical model for calculating the optimal leveling stiffness of the pile top displacement regulators in the composite foundation.

Solve the optimal mathematical model for calculating the optimal leveling stiffness of the pile top displacement regulators in the composite foundation to obtain the optimal leveling stiffness.

Optionally, the determining basic parameters for calculating the optimal leveling stiffness of the pile top displacement regulators in the composite foundation includes determine parameters of concrete piles; and determine parameters of foundation soil.

Optionally, the parameters of the concrete piles include the diameter, the length, the lateral spacing, the vertical spacing of the concrete piles, and the standard value of a single-pile vertical bearing capacity.

Optionally, the parameters of the foundation soil include the compressive modulus of inter-pile soil, the standard value of a bearing capacity of the inter-pile soil, and the stress diffusion coefficient of the composite foundation.

Optionally, the building an optimal mathematical model for calculating the optimal leveling stiffness of the pile top displacement regulators in the composite foundation includes build the optimal mathematical model for calculating the optimal leveling stiffness of the pile top displacement regulators in the composite foundation by combining an objective function, a force control equation, a deformation coordination equation, a bearing capacity constraint condition of the inter-pile soil, and a bearing capacity constraint condition of the concrete piles.

Optionally, the building an optimal mathematical model for calculating the optimal leveling stiffness of the pile top displacement regulators in the composite foundation specifically includes:

1. Build the objective function by setting a total load applied to the top of the raft as the objective function and maximize the total load to maximize the bearing capacity of the composite foundation:

$$\text{Maximize:} Q \qquad (1)$$

where Q denotes the total load applied to the top of the raft, and Maximize denotes "maximize".

2. Build the force control equation for the joint bearing of the concrete piles and the foundation soil, where the total load applied to the top of the raft is jointly borne by the concrete piles and the inter-pile soil:

$$Q = n \times (F_s + F_z) \qquad (2)$$

where Q denotes the total load applied to the top of the raft, $F_s$ denotes an additional single-pile load applied by the raft to the inter-pile soil in the composite foundation, $F_z$ denotes an additional single-pile load applied by the raft to the concrete pile in the composite foundation, and n denotes the quantity of the concrete piles in the composite foundation.

Figure 4:
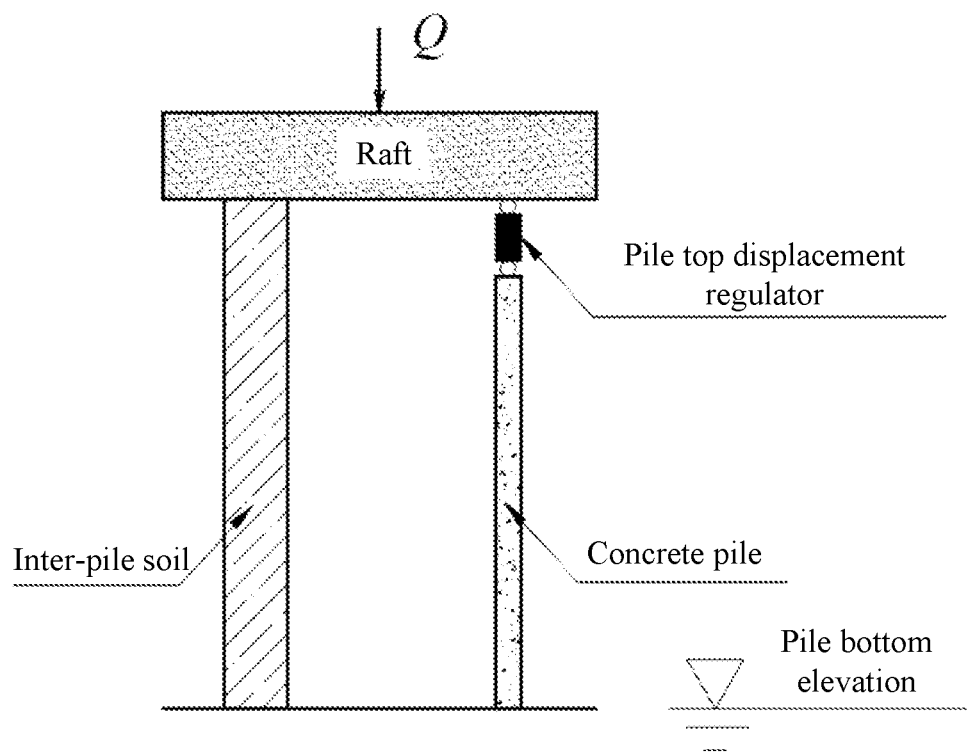
FIG. 4 is a schematic diagram of the mechanical action of inter-pile soil, concrete piles, and pile top displacement regulators.
Figure 5:
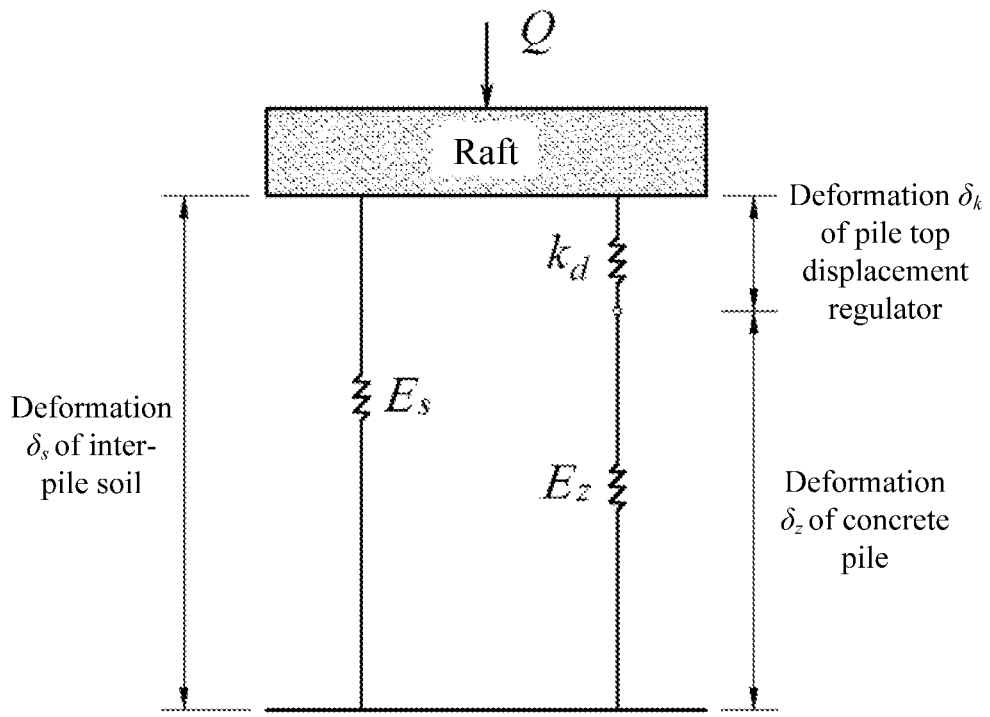
FIG. 5 is a schematic diagram of deformation coordination of the inter-pile soil, the concrete piles, and the pile top displacement regulators.
Figure 6:
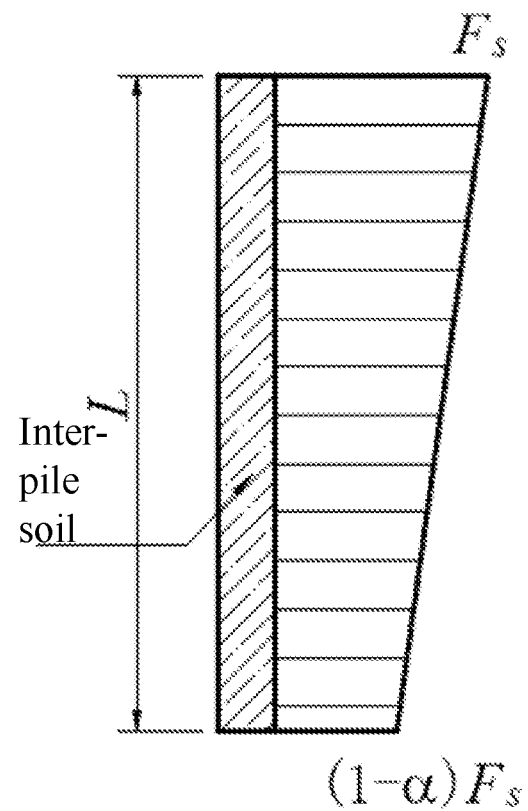
FIG. 6 is an axial force diagram of the inter-pile soil.
Figure 7:
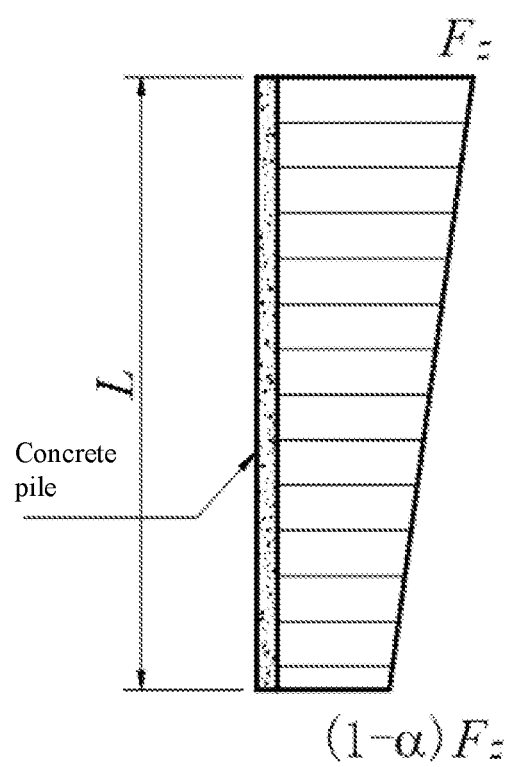
FIG. 7 is an axial force diagram of the concrete pile.

3. Build the deformation coordination equation between the concrete piles and the inter-pile soil. FIG. 4 is a schematic diagram of the mechanical action of inter-pile soil, concrete piles, and pile top displacement regulators. FIG. 5 is a schematic diagram of the deformation coordination of the inter-pile soil, the concrete piles, and the pile top displacement regulators. FIG. 6 is an axial force diagram of the inter-pile soil. FIG. 7 is an axial force diagram of the concrete pile.

(1) Build the deformation equation of the inter-pile soil in the composite foundation:

$$\delta_s = \frac{2(2-\alpha)F_s L}{E_s(4dl - \pi D^2)} \quad (3)$$

where $\delta_s$ denotes the deformation of the inter-pile soil in the composite foundation, $E_s$ denotes the compressive modulus of the inter-pile soil in the composite foundation, d denotes the lateral spacing of the concrete piles in the composite foundation, l denotes the vertical spacing of the concrete piles in the composite foundation, D denotes the diameter of the concrete pile in the composite foundation, L denotes the length of the concrete pile in the composite foundation, $\alpha$ denotes the stress diffusion coefficient of the composite foundation, and $F_s$ denotes the additional single-pile load applied by the raft to the inter-pile soil in the composite foundation.

(2) Build the deformation equation of the concrete piles in the composite foundation:

$$\delta_z = \frac{2(2-\alpha)F_z L}{\pi E_z D^2} \quad (4)$$

where $\delta_z$ denotes the deformation of the concrete piles in the composite foundation, $E_z$ denotes the compressive modulus of the concrete piles in the composite foundation, d denotes the lateral spacing of the concrete piles in the composite foundation, l denotes the vertical spacing of the concrete piles in the composite foundation, D denotes the diameter of the concrete pile in the composite foundation, L denotes a calculated depth of the composite foundation, $\alpha$ denotes the stress diffusion coefficient of the composite foundation, and $F_z$ denotes the additional single-pile load applied by the raft to the concrete pile in the composite foundation.

(3) Build the deformation equation of the pile top displacement regulators in the composite foundation:

$$\delta_k = \frac{F_z}{k_d} \quad (5)$$

where $\delta_k$ denotes the deformation of the pile top displacement regulators in the composite foundation, $k_d$ denotes a leveling stiffness of the pile top displacement regulators in the composite foundation, and $F_z$ denotes the additional single-pile load applied by the raft to the concrete pile in the composite foundation.

(4) Build the deformation coordination control equation of the concrete piles and the inter-pile soil in the composite foundation, where the deformation of the inter-pile soil is equal to a sum of the deformation of the concrete piles and the deformation of the pile top displacement regulators:

$$\delta_s = \delta_z + \delta_k \quad (6)$$

where $\delta_s$ denotes the deformation of the inter-pile soil in the composite foundation, $\delta_z$ denotes the deformation of the concrete piles in the composite foundation, and $\delta_k$ denotes the deformation of the pile top displacement regulators in the composite foundation.

4. Build the bearing capacity constraint of the inter-pile soil:

$$F_s \leq \frac{f_a(4dl - \pi D^2)}{4} \quad (7)$$

where $f_a$ denotes an eigenvalue of the bearing capacity of the foundation soil, $F_s$ denotes the additional single-pile load applied by the raft to the inter-pile soil in the composite foundation, d denotes the lateral spacing of the concrete piles in the composite foundation, l denotes the vertical spacing of the concrete piles in the composite foundation, and D denotes the diameter of the concrete pile in the composite foundation.

5. Build the bearing capacity constraint of the concrete piles:

$$F_z \leq P_a \quad (8)$$

where $P_a$ denotes an eigenvalue of the single-pile vertical bearing capacity and $F_z$ denotes the additional single-pile load applied by the raft to the concrete pile in the composite foundation.

6. Build the optimal mathematical model for calculating the optimal leveling stiffness of the pile top displacement regulators in the composite foundation based on the objective function, the force control equation, the deformation coordination equation, the bearing capacity constraint of the inter-pile soil, and the bearing capacity constraint of the concrete piles:

$$\begin{cases} \text{Maximize: } Q \\ \text{Subject to: } Q = n(F_s + F_z) \\ \quad \delta_s = \frac{2(2-\alpha)F_s L}{E_s(4dl - \pi D^2)}; \delta_z = \frac{2(2-\alpha)F_z L}{\pi E_z D^2}; \delta_k = \frac{F_z}{k_d} \\ \quad \delta_s = \delta_z + \delta_k \\ \quad F_s \leq \frac{f_a(4dl - \pi D^2)}{4} \\ \quad F_z \leq P_a \end{cases}$$

Optionally, the solving the optimal mathematical model for calculating the optimal leveling stiffness of the pile top displacement regulators in the composite foundation to obtain the optimal leveling stiffness includes: bring the known parameters n, $E_s$, d, l, D, L, $\alpha$, $E_z$, $f_a$, and $P_a$ into the optimal mathematical model for calculating the optimal leveling stiffness of the pile top displacement regulators in the composite foundation; solve the optimal mathematical model for calculating the optimal leveling stiffness of the pile top displacement regulators in the composite foundation by taking the total load Q applied to the top of the raft as the objective function and $F_s$, $F_z$, $\delta_s$, $\delta_z$, $\delta_k$, and $k_d$ as decision variables to obtain calculation results of the total load Q applied to the top of the raft and the decision variables $F_s$, $F_z$, $\delta_s$, $\delta_z$, $\delta_k$, and $k_d$; and obtain an optimal value of the leveling stiffness $k_d$ of the pile top displacement regulators in the composite foundation to maximize the total load Q applied to the top of the raft. $F_s$ denotes an additional single-pile load applied by the raft to the inter-pile soil in the composite foundation; $F_z$ denotes an additional single-pile load applied by the raft to the concrete pile in the composite foundation; n denotes the quantity of the concrete piles in the composite foundation; $\delta_s$ denotes the deformation of the inter-pile soil in the composite foundation; $E_s$ denotes the compressive modulus of the inter-pile soil in the composite foundation; d denotes the lateral spacing of the concrete piles in the composite foundation; l denotes the vertical spacing of the concrete piles in the composite foundation; D denotes the diameter of the concrete pile in the composite foundation; L denotes the length of the concrete pile in the composite foundation; α denotes the stress diffusion coefficient of the composite foundation; $δ_z$ denotes the deformation of the concrete piles in the composite foundation; $E_z$ denotes the compressive modulus of the concrete piles in the composite foundation; $δ_k$ denotes the deformation of the pile top displacement regulators in the composite foundation; $f_a$ denotes the standard value of the bearing capacity of the foundation soil; and $P_a$ denotes the standard value of the single-pile vertical bearing capacity.

Optionally, the optimal mathematical model for calculating the optimal leveling stiffness of the pile top displacement regulators in the composite foundation is solved by an interior-point algorithm.

The present disclosure further provides a device for calculating an optimal leveling stiffness of pile top displacement regulators in a composite foundation, including:

a first module configured to determine basic parameters for calculating the optimal leveling stiffness of the pile top displacement regulators in the composite foundation;

a second module configured to build an optimal mathematical model for calculating the optimal leveling stiffness of the pile top displacement regulators in the composite foundation;
and a solving module configured to solve the optimal mathematical model for calculating the optimal leveling stiffness of the pile top displacement regulators in the composite foundation to obtain the optimal leveling stiffness.

Further, the implementation steps of the method in the above embodiments are described as follows.

The data used include:

The count n of the concrete piles in the composite foundation is 20. The compressive modulus $E_s$ of the inter-pile soil in the composite foundation is 60,000 kPa. The lateral spacing d of the concrete piles in the composite foundation is 2.4 m. The vertical spacing l of the concrete piles in the composite foundation is 2.4 m. The diameter D of the concrete piles in the composite foundation is 0.8 m. The length L of the concrete pile in the composite foundation is 30 m. The stress diffusion coefficient α of the composite foundation is 0.55. The compressive modulus $E_z$ of the concrete pile in the composite foundation is 4,000,000 kPa. The standard value $f_a$ of the bearing capacity of the foundation soil is 400 kPa. The standard value $P_a$ of the single-pile vertical bearing capacity is 2,500 kN.

The known parameters n, $E_s$, d, l, D, L, α, $E_z$, $f_a$, and $P_a$ are brought into the optimal mathematical model for calculating the optimal leveling stiffness of the pile top displacement regulators in the composite foundation. By taking the total load Q applied to the top of the raft as the objective function and taking $F_s$, $F_z$, $δ_s$, $δ_z$, $δ_k$, and $k_d$ as the decision variables, the nonlinear mathematical programming model is solved by the interior-point algorithm, and the calculation results of the total load Q applied to the top of the raft and the decision variables $F_s$, $F_z$, $δ_z$, $δ_k$ and $k_d$ are obtained, as shown in Table 1. In this embodiment, when the total load Q applied to the top of the raft takes the maximum value, the leveling stiffness $k_d$ of the pile top displacement regulator in the composite foundation is 21,184.28 kN/m.

TABLE 1

Statistical table of calculation results in the embodiment

| Variable type | Variable name | Variable symbol | Results |
|---|---|---|---|
| Objective function | Total load applied to the top of the raft | Q | 92060.80 kN |
| Decision variables | Additional single-pile load applied by the raft to the concrete pile in the composite foundation | $F_z$ | 2103.04 kN |
| | Additional single-pile load applied by the raft to the inter-pile soil in the composite foundation | $F_s$ | 2500.00 kN |
| | Deformation of the inter-pile soil in the composite foundation | $δ_s$ | 0.145 m |
| | Deformation of the concrete piles in the composite foundation | $δ_z$ | 0.027 m |
| | Deformation of the pile top displacement regulators in the composite foundation | $δ_k$ | 0.117 m |
| | Leveling stiffness of the pile top displacement regulator in the composite foundation | $k_d$ | 21184.28 kN/m |

Although the embodiments of the present disclosure are described in detail above in conjunction with the drawings, the present disclosure is not limited to the above-described embodiments, and various changes may be made without departing from the spirit of the present disclosure within the knowledge of those skilled in the art.

What is claimed is:

1. A method for calculating an optimal leveling stiffness of pile top displacement regulators in a composite foundation, comprising:

determining basic parameters for calculating the optimal leveling stiffness of the pile top displacement regulators in the composite foundation;

building an optimal mathematical model for calculating the optimal leveling stiffness of the pile top displacement regulators in the composite foundation; and solving the optimal mathematical model for calculating the optimal leveling stiffness of the pile top displacement regulators in the composite foundation to obtain the optimal leveling stiffness;

wherein, the building the optimal mathematical model for calculating the optimal leveling stiffness of the pile top displacement regulators in the composite foundation comprises:

I. building an objective function by setting a total load applied to a top of a raft as the objective function and maximizing the total load to maximize a bearing capacity of the composite foundation:

Maximize:$Q$

II. building a force control equation for a joint bearing of concrete piles and a foundation soil, wherein the total load applied to the top of the raft is jointly borne by the concrete piles and an inter-pile soil:

$Q = n \times (F_s + F_z)$

III. building a deformation coordination equation between the concrete piles and the inter-pile soil:

(1) building a deformation equation of the inter-pile soil in the composite foundation:

$$\delta_s = \frac{2(2-\alpha)F_s L}{E_s(4dl - \pi D^2)}$$

(2) building a deformation equation of the concrete piles in the composite foundation:

$$\delta_z = \frac{2(2-\alpha)F_z L}{\pi E_z D^2}$$

(3) building a deformation equation of the pile top displacement regulators in the composite foundation:

$$\delta_k = \frac{F_z}{k_d}$$

(4) building a deformation coordination control equation of the concrete piles and the inter-pile soil in the composite foundation, wherein a deformation of the inter-pile soil is equal to a sum of a deformation of the concrete piles and a deformation of the pile top displacement regulators:

$$\delta_s = \delta_z + \delta_k$$

IV. building a bearing capacity constraint of the inter-pile soil:

$$F_s \leq \frac{f_a(4dl - \pi D^2)}{4}$$

V. building a bearing capacity constraint of the concrete piles:

$$F_z \leq P_a$$

VI. building the optimal mathematical model for calculating the optimal leveling stiffness of the pile top displacement regulators in the composite foundation based on the objective function, the force control equation, the deformation coordination equation, the bearing capacity constraint of the inter-pile soil, and the bearing capacity constraint of the concrete piles:

$$\begin{cases} \text{Maximize: } Q \\ \text{Subject to: } Q = n(F_s + F_z) \\ \delta_s = \frac{2(2-\alpha)F_s L}{E_s(4dl - \pi D^2)}; \delta_z = \frac{2(2-\alpha)F_z L}{\pi E_z D^2}; \delta_k = \frac{F_z}{k_d} \\ \delta_s = \delta_z + \delta_k \\ F_s \leq \frac{f_a(4dl - \pi D^2)}{4} \\ F_z \leq P_a \end{cases}$$

wherein Q denotes the total load applied to the top of the raft, Maximize denotes "maximize", $F_s$ denotes an additional single-pile load applied by the raft to the inter-pile soil in the composite foundation, $F_z$ denotes an additional single-pile load applied by the raft to the concrete pile in the composite foundation, n denotes a quantity of the concrete piles in the composite foundation, $\delta_s$ denotes the deformation of the inter-pile soil in the composite foundation, $E_s$ denotes a compressive modulus of the inter-pile soil in the composite foundation, d denotes a lateral spacing of the concrete piles in the composite foundation, l denotes a vertical spacing of the concrete piles in the composite foundation, D denotes a diameter of the concrete pile in the composite foundation, L denotes a length of the concrete pile in the composite foundation, $\alpha$ denotes a stress diffusion coefficient of the composite foundation, $\delta_z$ denotes the deformation of the concrete piles in the composite foundation, $E_z$ denotes a compressive modulus of the concrete piles in the composite foundation, $\delta_k$ denotes the deformation of the pile top displacement regulators in the composite foundation, $k_d$ denotes a leveling stiffness of the pile top displacement regulators in the composite foundation, $f_a$ denotes a standard value of a bearing capacity of the foundation soil, and $P_a$ denotes a standard value of a single-pile vertical bearing capacity.

2. The method for calculating the optimal leveling stiffness of the pile top displacement regulators in the composite foundation according to claim 1, wherein the determining the basic parameters for calculating the optimal leveling stiffness of the pile top displacement regulators in the composite foundation comprises determining parameters of the concrete piles, and determining parameters of the foundation soil.

3. The method for calculating the optimal leveling stiffness of the pile top displacement regulators in the composite foundation according to claim 2, wherein the parameters of the concrete piles comprise the diameter, the length, the lateral spacing, and the vertical spacing of the concrete piles, and the standard value of the single-pile vertical bearing capacity.

4. The method for calculating the optimal leveling stiffness of the pile top displacement regulators in the composite foundation according to claim 2, wherein the parameters of the foundation soil comprise the compressive modulus of the inter-pile soil, a standard value of a bearing capacity of the inter-pile soil, and the stress diffusion coefficient of the composite foundation.

5. The method for calculating the optimal leveling stiffness of the pile top displacement regulators in the composite foundation according to claim 1, wherein the building the optimal mathematical model for calculating the optimal leveling stiffness of the pile top displacement regulators in the composite foundation comprises building the optimal mathematical model for calculating the optimal leveling stiffness of the pile top displacement regulators in the composite foundation by combining the objective function, the force control equation, the deformation coordination equation, a bearing capacity constraint condition of the inter-pile soil, and a bearing capacity constraint condition of the concrete piles.

6. The method for calculating the optimal leveling stiffness of the pile top displacement regulators in the composite foundation according to claim 1, wherein the solving the optimal mathematical model for calculating the optimal leveling stiffness of the pile top displacement regulators in the composite foundation to obtain the optimal leveling stiffness comprises bringing the known parameters n, $E_s$, d, l, D, L, $\alpha$, $E_z$, $f_a$, and $P_a$ into the optimal mathematical model for calculating the optimal leveling stiffness of the pile top displacement regulators in the composite foundation; solving the optimal mathematical model for calculating the optimal leveling stiffness of the pile top displacement regulators in the composite foundation by taking the total load Q applied to the top of the raft as the objective function and $F_s$, $F_z$, $\delta_s$, $\delta_z$, $\delta_k$, and $k_d$ as decision variables to obtain calculation results of the total load Q applied to the top of the raft and the decision variables $F_s$, $F_z$, $\delta_s$, $\delta_z$, $\delta_k$, and $k_d$; and obtaining an optimal value of the leveling stiffness $k_d$ of the pile top displacement regulators in the composite foundation to maximize the total load Q applied to the top of the raft, wherein $F_s$ denotes the additional single-pile load applied by the raft to the inter-pile soil in the composite foundation, $F_z$ denotes the additional single-pile load applied by the raft to the concrete pile in the composite foundation, n denotes the quantity of the concrete piles in the composite foundation, $\delta_s$ denotes the deformation of the inter-pile soil in the composite foundation, $E_s$ denotes the compressive modulus of the inter-pile soil in the composite foundation, d denotes the lateral spacing of the concrete piles in the composite foundation, l denotes the vertical spacing of the concrete piles in the composite foundation, D denotes the diameter of the concrete pile in the composite foundation, L denotes the length of the concrete pile in the composite foundation, $\alpha$ denotes the stress diffusion coefficient of the composite foundation, $\delta_z$ denotes the deformation of the concrete piles in the composite foundation, $E_z$ denotes the compressive modulus of the concrete piles in the composite foundation, $\delta_k$ denotes the deformation of the pile top displacement regulators in the composite foundation, $f_a$ denotes the standard value of the bearing capacity of the foundation soil, and $P_a$ denotes the standard value of the single-pile vertical bearing capacity.

7. The method for calculating the optimal leveling stiffness of the pile top displacement regulators in the composite foundation according to claim 6, wherein the optimal mathematical model for calculating the optimal leveling stiffness of the pile top displacement regulators in the composite foundation is solved by an interior-point algorithm.

* * * * *